W. H. EGGLESTON.
Hoe.

No. 201,395.   Patented March 19, 1878.

WITNESSES:
Henry N. Miller
C. Sedgwick

INVENTOR:
W. H. Eggleston
BY Munn & Co.
ATTORNEYS.

UNITED STATES PATENT OFFICE.

WALTER H. EGGLESTON, OF SUGAR LAND, TEXAS.

IMPROVEMENT IN HOES.

Specification forming part of Letters Patent No. 201,395, dated March 19, 1878; application filed February 6, 1878.

*To all whom it may concern:*

Figure 1:
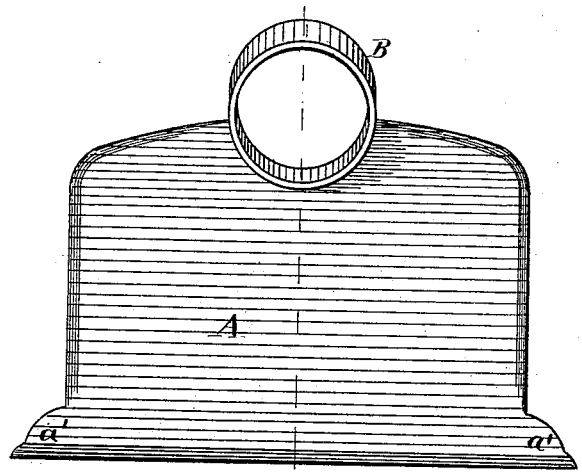
Figure 2:
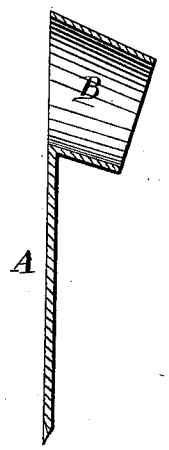

Be it known that I, WALTER H. EGGLESTON, of Sugar Land, in the county of Fort Bend and State of Texas, have invented a new and useful Improvement in Hoes, of which the following is a specification:

Figure 1 is a front view of my improved hoe. Fig. 2 is a cross-section of the same, taken through the line $x$ $x$, Fig. 1.

Similar letters of reference indicate corresponding parts.

The object of this invention is to furnish an improved hoe for weeding cotton and other plants, which shall be so constructed as to do better work than hoes constructed in the usual way, and shall be lighter, less liable to clog with dirt, and will enable the grass and weeds to be cut closer to the roots of the plants without injuring the stalks.

The invention consists in a hoe in which the blade is set in the eye at an inclination with the plane of the handle, is plated with steel upon its lower side, has its forward edge beveled upon the upper side, has its side edges beveled, and has projecting points formed upon its forward corners, as hereinafter fully described.

A is the hoe-plate, which is set in the eye at the proper inclination for weeding, so that it will not be necessary to bend it. This bending of the hoe-plate makes it more liable to break, and also causes it to gather dirt, making it heavy and unhandy when in use. The plate A is plated with steel upon its lower side, and is beveled upon the upper side of its edge, to prevent it from bouncing or jumping over and leaving small grass uncut when the ground is hard and dry.

Upon the corners of the blade A are formed projecting points $a'$, to clip the small blades of grass at the roots of the plants without bruising the stalks, causing them to die, and thus losing the stand. The side edges of the blade A are also beveled, so that by turning the hoe sidewise between the stalks and grass and pushing it from you it will cut the grass and leave the stalks uninjured and clean.

A hoe thus constructed will cut wider than an ordinary hoe, will be much lighter and handier, and will enable a workman to do more work with greater ease.

Having thus described my invention, I claim as new and desire to secure by Letters Patent—

A hoe in which the blade A is set in the eye B at an inclination with the plane of the handle, is plated with steel upon its lower side, has its forward edge beveled upon the upper side, has its side edges beveled, and has projecting points formed upon its forward corner, substantially as herein shown and described.

WALTER H. EGGLESTON.

Witnesses:
JEREMIAH BUCKLEY,
LAURENCE ANSTAETT.